United States Patent
Zhang et al.

(10) Patent No.: US 11,184,627 B2
(45) Date of Patent: Nov. 23, 2021

(54) VIDEO TRANSCODING SYSTEM, METHOD, APPARATUS, AND STORAGE MEDIUM

(71) Applicant: Tencent Technology (Shenzhen) Company Limited, Shenzhen (CN)

(72) Inventors: Hongshun Zhang, Shenzhen (CN); Ximing Cheng, Shenzhen (CN); Huihui Hou, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 16/996,132

(22) Filed: Aug. 18, 2020

(65) Prior Publication Data

US 2020/0382803 A1    Dec. 3, 2020

Related U.S. Application Data

(63) Continuation of application No. PCT/CN2019/082227, filed on Apr. 11, 2019.

(30) Foreign Application Priority Data

May 31, 2018  (CN) .......................... 201810548780.1

(51) Int. Cl.
*H04N 19/40*   (2014.01)
*H04N 19/172*   (2014.01)
*H04N 19/177*   (2014.01)

(52) U.S. Cl.
CPC .......... *H04N 19/40* (2014.11); *H04N 19/172* (2014.11); *H04N 19/177* (2014.11)

(58) Field of Classification Search
CPC .... H04N 19/40; H04N 19/172; H04N 19/177; H04N 19/107; H04N 19/109;
(Continued)

(56) References Cited

U.S. PATENT DOCUMENTS 7,330,509 B2 *   2/2008   Lu ........................... H04N 19/40
                                                        375/240.03
8,955,027 B1 *   2/2015   Dong ................... H04N 21/435
                                                        725/116
(Continued)

FOREIGN PATENT DOCUMENTS

CN    101960852 A    1/2011
CN    105049889 A    11/2015
CN    106028066 A    10/2016

OTHER PUBLICATIONS

International Search Report and Written Opinion with English Translation for International Patent Application No. PCT/CN2019/082227 dated Jun. 24, 2019; 11 pages.
(Continued)

*Primary Examiner* — Tat C Chio
(74) *Attorney, Agent, or Firm* — Crowell & Moring LLP

(57) ABSTRACT

The embodiments of this disclosure provide a video transcoding system and method, and related products. The system includes: a main transcoder circuitry configured to acquire an input video, transcode the input video to generate a transcoded video, and transmit the transcoded video to a receiving device; and a backup transcoder circuitry configured to acquire the input video, buffer the input video, acquire transcoding location information of the main transcoder circuitry at the time when the main transcoder circuitry is down, transcode the buffered input video according to the transcoding location information to generate an output video, and transmit the output video to the receiving device.

20 Claims, 6 Drawing Sheets

(58) Field of Classification Search
CPC ............... H04N 19/127; H04N 21/234; H04N 21/4402; H04N 21/2343; H04N 21/44; H04N 21/2187; H04N 21/23418; H04N 21/234309; H04N 21/44008; H04N 21/440218

See application file for complete search history.

(56) References Cited

U.S. PATENT DOCUMENTS

| | | | |
|---|---|---|---|
| 9,479,720 B1* | 10/2016 | Hegar | H04L 65/605 |
| 10,735,783 B1* | 8/2020 | Shen | H04N 19/154 |
| 2014/0139733 A1* | 5/2014 | MacInnis | H04N 19/154 |
| | | | 348/441 |
| 2015/0281752 A1* | 10/2015 | Van Veldhuisen | |
| | | | H04N 21/8456 |
| | | | 725/116 |
| 2015/0381978 A1 | 12/2015 | Dunphy | |

OTHER PUBLICATIONS

Office Action with English Translation of Concise Explanation of Relevance for Chinese Patent Application No. 201810548780.1 dated Apr. 9, 2021; 8 pages.

\* cited by examiner

US 11,184,627 B2

VIDEO TRANSCODING SYSTEM, METHOD, APPARATUS, AND STORAGE MEDIUM

RELATED APPLICATION

This application is a continuation application of the International PCT Application No. PCT/CN2019/082227, filed with the China National Intellectual Property Administration, PRC on Apr. 11, 2019 which claims priority to Chinese Patent Application No. 201810548780.1, entitled "VIDEO TRANSCODING SYSTEM AND METHOD, AND RELATED PRODUCTS" and filed with the China National Intellectual Property Administration, PRC on May 31, 2018, which are incorporated herein by reference in their entireties.

FIELD OF THE TECHNOLOGY

Embodiments of this disclosure relate to the field of computer technologies, and in particular, to a system, a method, an apparatus, and a storage medium for video transcoding.

BACKGROUND OF THE DISCLOSURE

Video transcoding refers to conversion of a video stream into another video stream to adapt to different network bandwidths, different terminal processing capabilities, and different user requirements. The video transcoding is essentially a re-encoding process. Therefore, video streams before and after the conversion may or may not follow the same video encoding standard.

SUMMARY

Embodiments of this disclosure disclose a video transcoding system and method, and related products, to improve the reliability for video transcoding.

A first aspect of the embodiments of this disclosure provides a video transcoding system, including:

a main transcoder and a backup transcoder;

the main transcoder acquiring an input video, transcoding the input video to generate a transcoded video, and transmitting the transcoded video to a receiving device; and the backup transcoder acquiring the input video, buffering the input video, and acquiring transcoding location information of the main transcoder in a case that the main transcoder is down, transcoding the buffered input video according to the transcoding location information to generate an output video, and transmitting the output video to the receiving device.

A second aspect of the embodiments of this disclosure further provides a video transcoding method, performed by a computing device, the method including:

transmitting an input video to a main transcoder and a backup transcoder, controlling the main transcoder to transcode the input video and transmitting a transcoded video to a receiving device, and controlling the backup transcoder to buffer the input video;

acquiring a transcoding location information of the main transcoder in a case that the main transcoder is down; and transmitting the transcoding location information to the backup transcoder, controlling the backup transcoder to transcode, according to the transcoding location information, the buffered input video to generate an output video, and transmitting the output video to the receiving device.

A third aspect of the embodiments of this disclosure further provides a video transcoding apparatus, including a memory and a processor in communication with the memory, the memory being configured to store program instructions, and the program instructions being suitable to be loaded by the processor; and the processor being configured to load the program instructions and perform the video transcoding method according to any one of the embodiments of this disclosure.

A fourth aspect of the embodiments of this disclosure further provides a non-transitory storage medium, storing a plurality of program instructions, the program instructions being suitable to be loaded by a processor and performing the video transcoding method according to any one of the embodiments of this disclosure.

BRIEF DESCRIPTION OF THE DRAWINGS

To describe the technical solutions in the embodiments of this disclosure more clearly, the following describes the accompanying drawings required in the embodiments of this disclosure.

DESCRIPTION OF EMBODIMENTS

Figure 1:
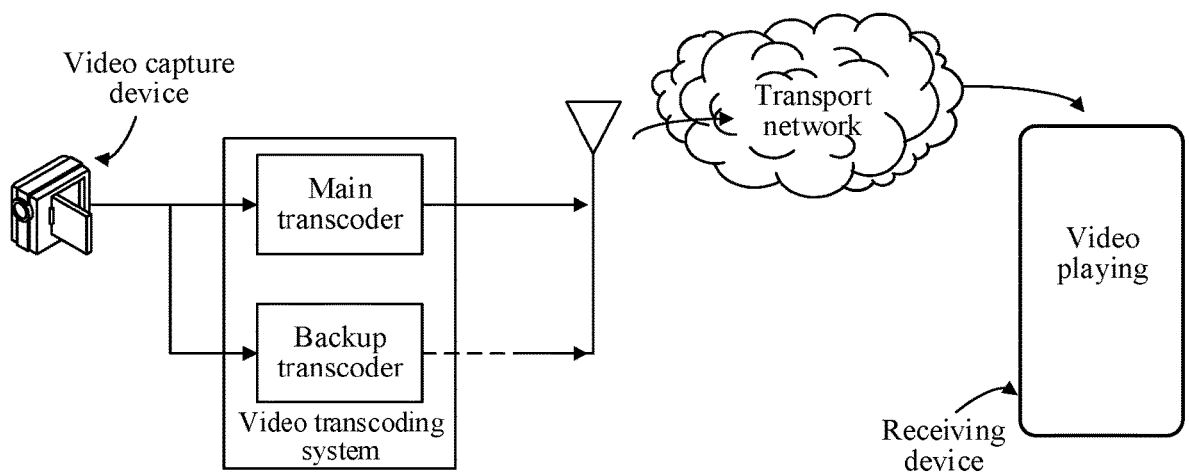
FIG. 1 is a schematic structural diagram of an exemplary system according to an embodiments of this disclosure.

The following clearly and completely describes the technical solutions in the embodiments of this disclosure with reference to the accompanying drawings in the embodiments of this disclosure. Apparently, the described embodiments are merely a part of embodiments of this disclosure rather than all of the embodiments.

It is to be understood that when used in this specification and the appended claims, the terms "include" and "comprise" indicate the presence of described features, wholes, steps, operations, elements and/or components, but do not exclude the presence or addition of one or more other features, wholes, steps, operations, elements, components and/or a set thereof.

It is further to be understood that terms used in this specification of this disclosure are merely intended to described objectives of the particular embodiments, but are not intended to limit this disclosure. As used in this specification of this disclosure and the appended claims, singular terms "a", "an" and "the" include plural referents unless the context clearly indicates otherwise.

It is to be further understood that a term "and/or" used in this specification of this disclosure and the appended claims refers to one or more of any and all possible combinations of the associated items that is listed and includes the combinations.

As used in this specification and the appended claims, the term "if" may be interpreted as "when" or "once" or "in response to determining" or "in response to detecting" according to the context. Similarly, the phrase "if determining" or "if detecting [described condition or event]" may be interpreted as "once determining" or "in response to determining" or "once detecting [described condition or event]" or "in response to detecting [described condition or event]" according to the context.

In the specification, claims, and accompanying drawings of this disclosure, the terms "first", "second", or the like are intended to distinguish between different objects but do not indicate a particular order.

A large-scale live video broadcast application scenario is used here as an example to illustrate the embodiments of this disclosure: a specially-assigned person captures a high-definition raw video on site, the video is encoded in accordance with a standard suitable for high bandwidth transport network and then uploaded to a backend. The video is transcoded by the backend into streams suitable for different bandwidths and different resolutions then transmitted to user sides such that users can select to watch. The entire process has a high requirement for real-time processing and live site synchronization, hence also high requirement for the encoding process. If transcoding at the backend is down, the video may not be watched or may get stuck, or black screen may occur on the receiving side.

One solution to the above issue is: notifying a receive end to keep displaying the previous received video, restarting an encoder of the backend at the same time, requesting for an I-frame from a transmit end, then the encoder starting re-pulling a video stream starting from the I-frame, and after decoding and re-encoding the video stream, a video transmission to the receive end being resumed. No black screen appears in the foregoing solution, but video display getting stuck for a long time.

FIG. 1 is a schematic architectural diagram of a network system according to an embodiments of this disclosure, including a video capture device, a video transcoding system (may alternatively be referred to as a video transcoding device), a transport network, and a receiving device. A video source is captured by the video capture device, transmitted to the video transcoding device, and transmitted to the receiving device through the transport network after being transcoded by the video transcoding device. The video transcoding system includes a main transcoder and a backup transcoder. An input video is inputted on the left. Because a video is usually transmitted in the form of a stream, it may alternatively be referred to as an input stream or input video stream. Additionally, in the live broadcast industry, the video is generated on the user side. The video is transmitted to a server or forwarded to a receiving device through the network after being transcoded. Therefore, the video needs to be uploaded, and the input stream may alternatively be referred to as an upload stream and an uplink stream. In the video transcoding system, the video stream inputted on the left is transmitted to the main transcoder and the backup transcoder simultaneously. In a case that the main transcoder is working normally, the backup transcoder is in a standby state in the sense it may not need to perform transcoding and only need to buffer the input video. In a case that the main transcoder is down, the backup transcoder goes active to perform the operation of transcoding.

Figure 2:
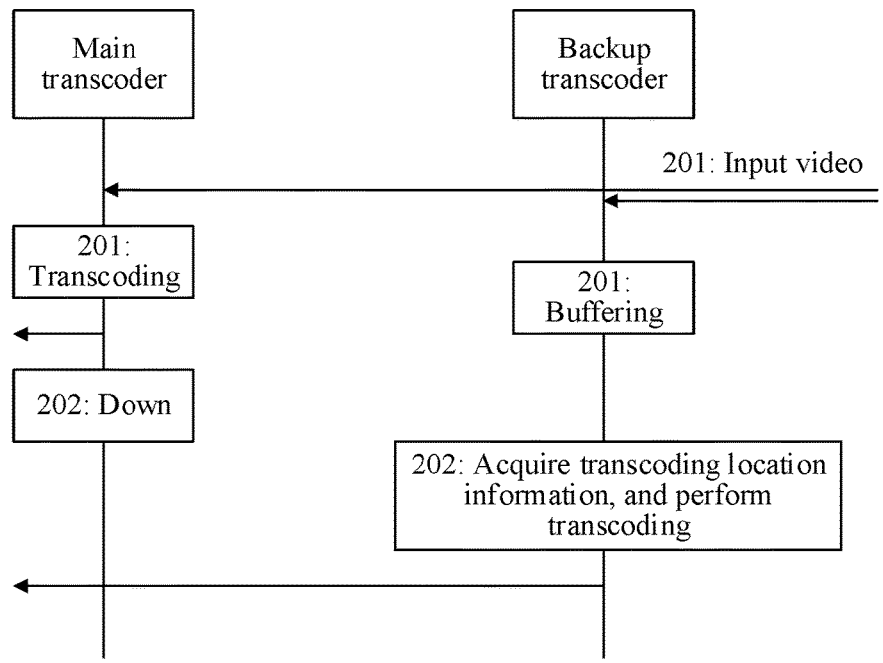
FIG. 2 is a schematic flowchart of a method according to an embodiments of this disclosure.

As shown in FIG. 2, the embodiments of this disclosure provide a video transcoding system, including a main transcoder and a backup transcoder. The specific working process of the video transcoding system is as follows:

201. The main transcoder and the backup transcoder acquire an input video; the main transcoder transcodes the input video and then transmits the transcoded input video to a receiving device; the backup transcoder buffering the input video.

The foregoing input video refers to a video inputted to a video transcoder, and generally may be a raw video stream acquired by a video capture device, for example, a video stream acquired by a camera in the live video broadcast industry.

The process of transcoding input data by the main transcoder may follow a general transcoding method. A decoder is first used to decode an input video, and then a decoding output is encoded into a stream that is suitable for different bandwidths and different resolutions.

If hard transcoding is adopted, the main transcoder and the backup transcoder may be hardware based that may be independent of each other. If soft transcoding is used, the main transcoder and the backup transcoder may each correspond to a transcoding process or a virtual transcoder. There is no limitation on the transcoding approach in this embodiments of this disclosure.

202. The backup transcoder acquires transcoding location information of the main transcoder; in a case that the main transcoder is down, the backup transcoder transcodes, according to the transcoding location information, the buffered input video to acquire an output video and transmits the output video to the receiving device.

The foregoing transcoding location information is used to determine a transcoding location of the main transcoder at the time when the main transcoder is down. Thereby, an output video obtained by continuous transcoding of the backup transcoder may be connected to already transcoded output video. Because transcoding is usually in units of frames, the transcoding location information here may include a frame number of the transcoding of the main transcoder at the time when the main transcoder is down. The transcoding location may include information such as the sequence number of a transmitted data packet.

There are many ways to detect whether the main transcoder is down, such as, monitoring an output video of the main transcoder. If the main transcoder is not outputting video, it can be determined that the main transcoder is down. There is no unique limitation on the specific means about how to determine whether the main transcoder is down in the embodiments of this disclosure. For the backup transcoder, the backup transcoder may determine the status of the main transcoder by itself. Alternatively, other hardware or a virtual device or a process may notify the backup transcoder after knowing that the main transcoder is down.

As such, the video outputted by the backup transcoder may be connected to the output video stream from the moment when the main transcoder is down.

Based on the description of this embodiment, the main transcoder collaborates with the backup transcoder. Because a certain amount of un-transcoded video data exists when the main transcoder goes down, the backup transcoder picks up and continuously transcodes the un-transcoded data and a seamless switchover can be achieved. Accordingly, the smoothness of the video is maintained, black screen is avoided, and the whole system's reliability is improved.

Figure 3:
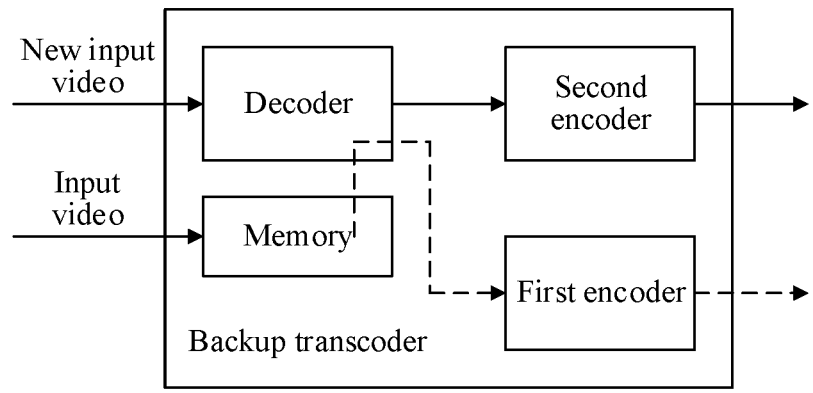
FIG. 3 is a schematic structural diagram of a backup transcoder according to an embodiments of this disclosure.

In an embodiment, as shown in FIG. 3, a more detailed structural diagram of the backup transcoder is provided. The backup transcoder includes a decoder, a first encoder, and a second encoder. The structural diagram shown in FIG. 3 further includes a memory that is configured to buffer an input video. The memory may be located outside the backup transcoder and may be dedicated or shared memory. For example, the memory may be a shared memory of the main transcoder and the backup transcoder. Additionally, the buffered input video in the memory may be a raw video or a video decoded by the decoder. The former, without pre-decoding, is more energy-saving, while the latter, with pre-decoding, may perform switch over faster subsequently. Any one of the two solutions may be selected according to actual needs.

The transcoding, by the backup transcoder, the buffered input video according to the transcoding location information includes:

decoding, by the decoder, the buffered input video according to the transcoding location information, and then transmitting buffered decoded data to the first encoder, and encoding, by the first encoder, the buffered decoded data, where the decoder is further configured to decode a new input video into new decoded data, and transmit the new decoded data to the second encoder, and the second encoder encodes the new decoded data, the new input video being an input video received after the main transcoder is down.

Figure 4:
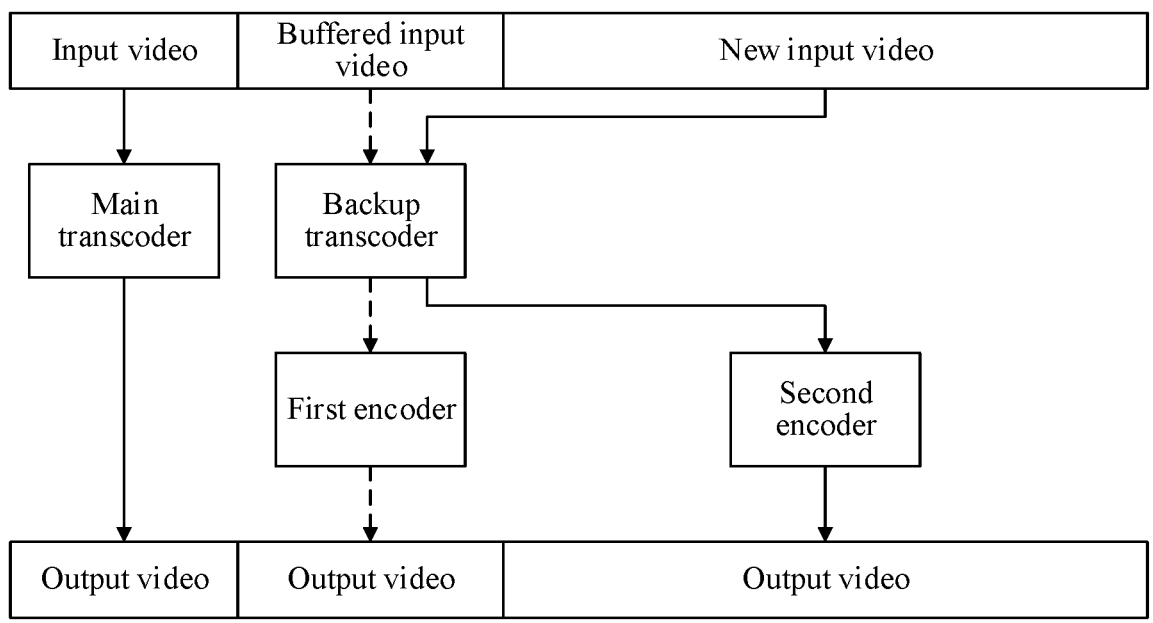
FIG. 4 is a schematic diagram of a transcoding correspondence and splicing according to an embodiments of this disclosure.

Based on this embodiment, the first encoder is configured to connect and make up videos missing from the moment the main transcoder is down by processing the already buffered video data which includes video frames un-transcoded by the main transcoder. The second encoder is configured to encode the new input video. After the first encoder completes the encoding and outputs the corresponding video, the second encoder takes over to encode the new input video and output the corresponding encoded video. The two encoders included in the backup transcoder perform encoding respectively and independently. FIG. 4 is a schematic diagram of connection of the video data.

In FIG. 4, the input video is those already transcoded by a main transcoder by the time the main transcoder is down. The buffered input video is those already buffered but not transcoded yet by the time the main transcoder is down. The new input video is those neither buffered nor transcoded by the time the main transcoder is down. After the main transcoder is down, the buffered input video is transcoded by a backup transcoder. Specifically, in one embodiment, the buffered video is decoded by a decoder of the backup transcoder and then encoded by the first encoder, to obtain a corresponding output video. Optionally, the buffered video may be pre-decoded and is ready for encoding. The new input video is also transcoded by the backup transcoder. Specifically, the new input video is decoded by the decoder of the backup transcoder and then encoded by the second encoder, to obtain a corresponding output video. As a result, three streams of output videos may be seamlessly connected together.

In an embodiment, the first encoder is configured to connect videos missing since the main transcoder is down. The second encoder is configured to encode the new input video. In order to adapt to needs of different encoders, the embodiments of this disclosure may adopt the following solution: an encoding latency of the first encoder being lower than an encoding latency of the second encoder; and an encoding quality of the second encoder being higher than an encoding quality of the first encoder.

The foregoing encoding quality may refer to the compression performance such as compression ratio with a specific algorithm or the encoding quality of an image.

The first encoder may adopt IPP-frame mode encoding. The IPP-frame mode encoding means that the frame types in the stream include only I-frame and P-frame. The latency is extremely low and the compression performance is slightly weak. The second encoder may adopt IPB-frame mode encoding. The IPB-frame mode encoding means that the frame types in the video stream include I-frame, B-frame and P-frame. For the IPB-frame mode encoding, the latency is slightly large, the encoding complexity is relatively high, and the compression performance is higher.

The I-frame is alternatively referred to as an intra-coded frame, which is an independent frame with all information and may be decoded without referring to other images. The I-frame may be simply understood as a static picture. The first frame in a video sequence is always the I-frame, because it is a key frame.

The P-frame is alternatively referred to as a predictive-coded frame, which may need to be encoded with reference to the previous I-frame. The P-frame indicates a difference between pictures of the current frame and the previous frame (the previous frame may be the I-frame or the P-frame). During decoding, a difference defined by the current frame needs to be superimposed onto a previously buffered frame to generate a final frame. Compared with the I-frame, the P-frame usually occupies fewer data bits, but the disadvantage is that the P-frame is very sensitive to transmission errors due to the complex dependency on the previous P or I reference frame.

The B-frame is alternatively referred to as a bidirectional predictive-coded frame, that is, the B-frame records a difference between the current frame and the previous and next frames. In other words, to decode the B-frame, the previously buffered picture needs to be obtained, and the next picture also needs to be decoded. The final picture is obtained by superimposing the previous and next pictures onto data of the current frame. The B-frame has a high compression rate, but has a relatively high requirement for the decoding performance.

In an embodiment, because the second encoder has higher encoding efficiency, the B-frame is used. As explained above, the B-frame cannot be correctly decoded without previous and next P-frames. Therefore, the embodiments of this disclosure further provide an implementation solution for packaging video frames: an encoding result of the second encoder including a B-frame; the second encoder being further configured to encode a video frame at the last non-B-frame location of the buffered input video to obtain a group of pictures that can be continuously decoded and buffer the group of pictures; and package and transmit the group of pictures to an output buffer, and then package and transmit the first I-frame or P-frame of a video frame obtained by encoding the new decoded data to the output buffer.

In this embodiment, the second encoder can improve the encoding efficiency by using the B-frame. During packaging, a group of pictures of the previous P-frame is packaged. Therefore, the video receive end may correctly and continuously perform decoding during decoding, thereby seamlessly splicing videos with different encoding qualities.

In an embodiment, a solution for avoiding a conflict between encoding results caused by the simultaneously encoding of the first encoder and the second encoder is further provided: the first encoder being further configured to transmit video frames acquired through encoding of the first encoder to an output buffer; the second encoder being further configured to transmit video frames acquired through encoding of the second encoder to a temporary buffer; and transmit the video frames in the temporary buffer to the output buffer according to a first-in first-out order after the end of encoding of the first encoder.

In this embodiment, the video frames acquired by the second encoder are first transmitted to the temporary buffer, but not directly transmitted to the output buffer, thereby adopting an asynchronous mode to solve the frame missing problem caused by the conflict between the video frames respectively acquired by the first encoder and the second encoder in the output buffer; and correspondingly, the problem of blurred screen in the receive end is also resolved.

In an embodiment, a specific implementation of buffering the input video is further provided, and the buffering, by the backup transcoder, the input video includes: storing, by the backup transcoder, the input video stream in a first-in first-out (FIFO) queue by using a video frame as a unit, and discarding, if the queue is full, a first video frame (i.e., the oldest video frame) in the queue.

Figure 5:
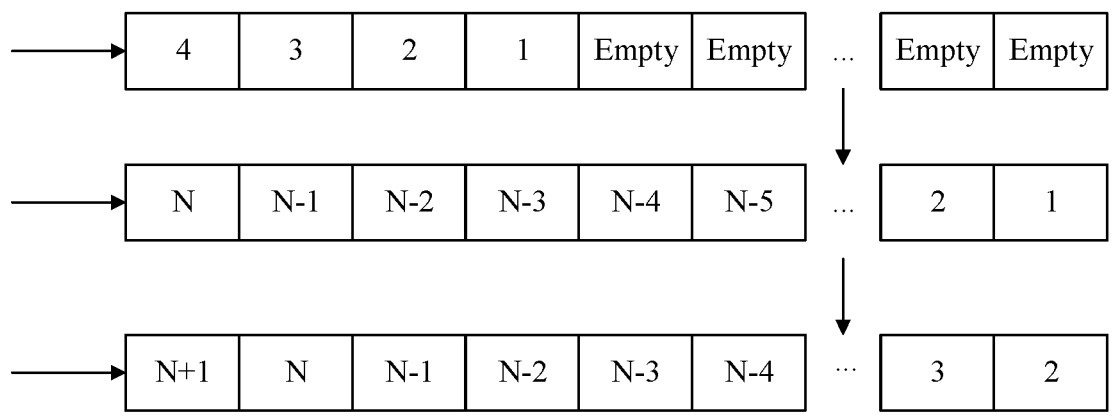
FIG. 5 is a schematic structural diagram of a first input first output queue according to an embodiments of this disclosure.

FIG. 5 is a schematic diagram of a first input first output buffering queue. Assuming that each rectangular grid corresponds to a storage space of a frame, and the number in the rectangular grid is a frame number. The first line indicates that the empty queue starts to buffer. The second line indicates that a queue is just full. The third line indicates that storage continues after the queue is full, where a video frame with frame number 1 (i.e., the oldest frame) is discarded. The queue may store N video frames in total. N here is a positive integer and may be arbitrarily set. There is no unique limitation on this in this embodiments of this disclosure.

In an embodiment, specific optional parameters of transcoding location information are further provided: the acquiring, by the backup transcoder, transcoding location information of the main transcoder includes:

receiving, by the backup transcoder, hash information and frame number of the last video frame generated by the main transcoder, the last audio frame number, and the last data packet number that are fed back by a monitoring device.

In an embodiment, because the transcoding location information may fail to be acquired, this embodiment provides a solution for this scenario, which is specifically as follows:

In a case that the acquisition of the transcoding location information fails, or in a case that the correct transcoding location when the main transcoder is down is not successfully determined, the backup transcoder starts to transcode an input video from the buffered start location, to acquire and transmit an output video to a receiving device.

As shown in FIG. 5, assuming that the video frame number is N-4 when the main transcoder is down, the backup transcoder needs to continue transcoding, and then the frame number "N-4" needs to be acquired. The video usually has corresponding sounds, and image frames correspond to audio frames, and correspondingly the audio frame number needs to be acquired as well. Additionally, an encoding output is transmitted and is usually transmitted in the form of a data packet, so that the number of the last data packet further needs to be acquired. When all these information are acquired, the backup transcoder may locate the video frame from which transcoding needs to start, the corresponding audio frame number, and how to number the data packet during transmission.

The embodiments of this disclosure further provide a video transcoding method, performed by a computing device. The specific process of the method may refer to the description of the video transcoding system in the previous embodiment. As shown in FIG. 2, the method includes:

201. Transmit an input video to a main transcoder and a backup transcoder, to cause the main transcoder transcode the input video and the backup transcoder buffer the input video.

In particular, the execution subject of the method provided in this embodiment may be hardware equipped with a transcoding control function, such as a computing device, or software or a virtual device equipped with a transcoding control function. If hard transcoding is adopted, the main transcoder and the backup transcoder may be hardware that may or may not be independent of each other. If soft transcoding is used, the main transcoder and the backup transcoder may each correspond to a transcoding process or a virtual transcoder implemented by software. There is no unique limitation on this in this embodiments of this disclosure.

202. Acquire transcoding location information of the main transcoder in a case that the main transcoder is down.

The foregoing transcoding location information is used to determine a transcoding location of the main transcoder at the time when the main transcoder is down. Therefore, an output video obtained by continuous transcoding of the backup transcoder may be connected to a transmitted video. Because the transcoding is usually in units of frames, the transcoding location information here may include a frame number of the transcoding of the main transcoder at the time when the main transcoder being down, and additionally the transcoding location correspondingly has information such as the sequence number of a transmitted data packet used for identifying the last transmitted data packet from the main transcoder.

In an embodiment, the acquiring transcoding location information of the main transcoder includes:

acquiring hash information and frame number of the last video frame generated by the main transcoder, the last audio frame number, and the last data packet number.

203. Transmit the transcoding location information to the backup transcoder, and control the backup transcoder to transcode, according to the transcoding location information, the buffered input video.

Based on the description of this embodiment, the main transcoder cooperates with the backup transcoder. Because a certain amount of un-transcoded data exists when the main transcoder goes down, the backup transcoder picks up and continuously transcodes the un-transcoded data and seamless switchover can be achieved. Accordingly, the smoothness of the video is maintained, black screen is avoided, and the whole system's reliability is improved.

In an embodiment, an implementation of respectively and independently transcoding the buffered input video and the new input video is further provided, which is specifically as follows: The controlling the backup transcoder to transcode, according to the transcoding location information, the buffered input video includes:

controlling the first encoder of the backup transcoder to transcode the buffered input video according to the transcoding location information; and the method further includes:

decoding a new input video into new decoded data, and transmitting the new decoded data to the second encoder, to make the second encoder encode the new decoded data, the new input video being an input video received after the moment when the main transcoder is down.

Based on this embodiment, the first encoder is configured to connect and make up videos missing since the main transcoder is down. The second encoder is configured to encode the new input video. After the first encoder completes the encoding and outputs the corresponding video, the second encoder takes over to encode the new input video and output the corresponding encoded video. The two encoders included in the backup transcoder perform encoding respectively and independently. FIG. 4 is a schematic diagram of connection of the video data. This embodiment is particularly suitable for hard decoding and hard encoding application scenarios.

In an embodiment, in order to adapt to different transcoding requirements of the buffered input video and the new input video, this embodiment provides the following solution: an encoding latency of the first encoder being lower than an encoding latency of the second encoder; and an encoding quality of the second encoder being higher than an encoding quality of the first encoder.

In an embodiment, because the second encoder has higher encoding efficiency, for example, higher compression ratio, the B-frame is used to adopt IPB-frame encoding, and the B-frame cannot be correctly decoded without previous and next P-frames. Therefore, the embodiments of this disclosure further provide an implementation solution for packaging video frames: an encoding result of the second encoder including a B-frame; the second encoder being further configured to encode a video frame at the last non-B-frame location of the buffered input video to obtain a group of pictures that can be continuously decoded and buffer the group of pictures; and package and transmit the group of pictures to an output buffer, and then package and transmit the first I-frame or P-frame of a video frame obtained by encoding the new decoded data to the output buffer.

In this embodiment, the second encoder can improve the encoding efficiency by using the B-frame. During packaging, a group of pictures of the previous P-frame is packaged. Therefore, the video receive end may correctly and continuously perform decoding during decoding, thereby seamlessly splicing videos with different encoding qualities.

In an embodiment, a solution for avoiding a conflict between encoding results caused by the simultaneously encoding of the first encoder and the second encoder is further provided, that is, the method further includes:

transmitting video frames acquired through encoding of the first encoder to an output buffer; transmitting video frames acquired through encoding of the second encoder to a temporary buffer; and transmitting the video frames in the temporary buffer to the output buffer according to a first input first output order after the end of encoding of the first encoder.

In this embodiment, the video frames acquired by the second encoder are first transmitted to the temporary buffer, but not directly transmitted to the output buffer, thereby adopting an asynchronous mode to solve the frame missing problem caused by the conflict between the video frames respectively acquired by the first encoder and the second encoder in the output buffer; and correspondingly, the problem of blurred screen in the receive end is also resolved.

In an embodiment, two transcoders may be disposed symmetrically, that is, a main transcoder and a backup transcoder have the same structure. The main transcoder and the backup transcoder switch role when a switch over happens. The transcoder that currently performs transcoding is considered to be the main transcoder, and the other transcoder is considered to be the backup transcoder. Therefore, the method further includes a switchover implementation:

setting the backup transcoder as a main transcoder after the main transcoder is down, setting the main transcoder that is down as a backup transcoder, and restarting the main transcoder that is down.

Based on the foregoing description, in the embodiments of this disclosure, two individual paths of encoding may be created. One path is main encoding and the other is backup encoding. After the main encoding is down, switchover to the backup encoding is performed. The main encoding may include a decoder and an encoder, where the decoder is configured to decode an upload video stream, and input the decoded video as a video source to the encoder. The encoder may adopt IPB-frame mode encoding. The backup encoding process in the other path may include a decoder and two encoders, where one of the two encoders may adopt low-latency IPP-frame mode encoding, and the other may adopt high-quality, high efficiency IPB-frame mode encoding. The backup encoding and the main encoding acquire an upload stream synchronously. After decoding, the decoder buffers certain decoded images. In normal working condition, the two encoders of the backup encoding do not need to perform encoding, but start encoding only after the main encoding service is down. Then, streams are spliced together to seamlessly connect live streams after the main encoding is down.

In an embodiment, because the transcoding location information may fail to be acquired, this embodiment provides a solution for this scenario, that is, the method further includes:

controlling, in a case that the acquisition of the transcoding location information fails, or in a case that the correct transcoding location when the main transcoder is down is not successfully determined, the backup transcoder to start to transcode an input video from the buffered start location, to acquire and transmit an output video to a receiving device.

Figure 6:
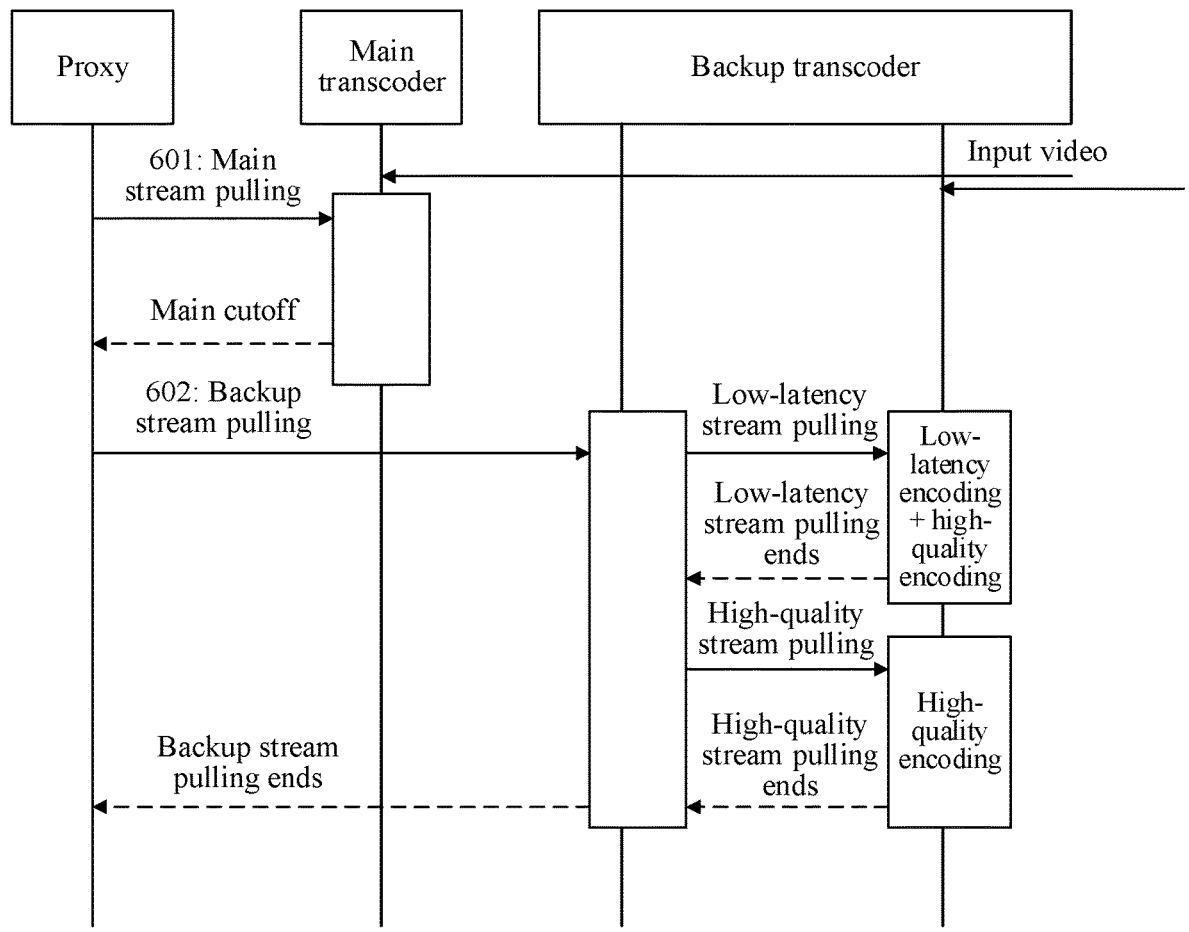
FIG. 6 is a schematic flowchart of a method according to an embodiments of this disclosure.

FIG. 6 is a schematic flowchart of a video transcoding method according to an embodiments of this disclosure. As shown in FIG. 6, the method includes the following steps:

Upload streams are synchronously transmitted to the main transcoder and the backup transcoder, where the main transcoder performs transcoding, the backup transcoder only buffers a certain number of frame of the upload streams, and the buffering method may refer to the buffering queue shown in FIG. 5.

Step 601. A proxy pulls a video stream from the main transcoder and if detects that the main transcoder is cut off or not responding, the proxy pulls a video stream from the backup transcoder after the proxy acquires a cutoff state.

The foregoing proxy may be an interface function module between the main transcoder and a receiving device. The proxy may transmit transcoding location information to the backup transcoder when pulling the video stream ("pulling the stream" for short) from the main transcoder.

Step 602. The backup transcoder performs two operations after receiving a stream pulling request of the proxy:

A. Low-Latency Stream Pulling:

Buffered image frames in a buffer are sent to a low-latency encoder for encoding, a high-quality encoder can be started at the same time, and new video frames are transmitted to the high-quality encoder.

In the foregoing part A, the low-latency encoder outputs streams with a nearly 0 latency, and the high-quality encoder buffers and initializes the new input video frames; and when the output streams of the low-latency encoder are exhausted, the initialization of the high-quality encoder is completed and may start to output video stream, so there is no gap in the video stream output.

B. High-Quality Stream Pulling:

When the output streams of the low-latency encoder are exhausted, the low-latency encoder is stopped, and the high-quality encoder continues to encode the output streams until backup stream pulling ends.

In the foregoing process, a pre-processing latency of the high-quality encoder is counteracted by the low-latency encoder, to implement a nearly 0-latency transition from the main transcode to the backup transcoder.

Figure 7:
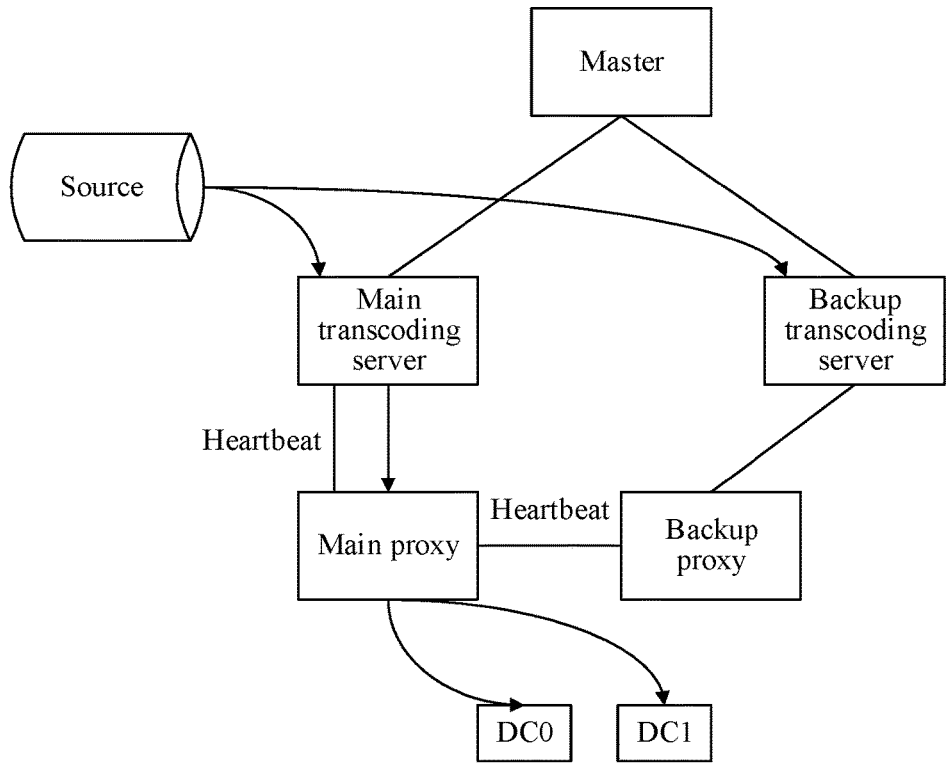
FIG. 7 is a schematic structural diagram of a system according to an embodiments of this disclosure.

Taking video transcoding of a large-scale live broadcast system as an example, FIG. 7 is a schematic architectural diagram of a live broadcast system, including: a master server; a main transcoding server and a backup transcoding server under the master server; and a main proxy, a backup proxy, and at least one data center (DC) such as DC0 and DC1 illustrated in FIG. 7. The backup transcoding server and the main transcoding server correspond to the foregoing backup transcoder and main transcoder, respectively.

A source is data of a raw video frame, and corresponds to the foregoing upload stream; the source, after being transcoded by the main transcoding server or the backup transcoding server, is transmitted to the data center by the main proxy or the backup proxy through stream pulling, and the video stream of the data center may be transmitted to the receiving device.

The above live video broadcast system is initialized before starting live broadcast. After the initialization is completed, the transcoding machine is divided into a main transcoding server and a backup transcoding server, both servers pull the video data (that is, source) from a video source server. The main transcoding server is in a state of transcoding an output stream, and the backup transcoder may only decode the input stream without encoding. Inside the backup transcoding server, a first input first output queue may be maintained, and certain video frames and audio frames are buffered for the inputted video and audio data. The main transcoding server may insert hash information corresponding to the raw video frame decoding YUV (a color encoding/decoding method) into a data packet during data packet packaging and outputting. There may be a plurality of first input first output queues, which respectively buffer peer to peer (P2P) headers, audio data packets, and decoded video frames. The P2P headers, the audio data packets, and the video frames have correspondences and are related in time.

A specific process is as follows:

After the proxy is started, the DC triggers the proxy to pull a stream; when the DC triggers the proxy to pull a stream, if the proxy is in an uninitialized state, the proxy queries the status information of the live video broadcast from the master server and performs an initialization operation of the proxy.

The proxy is divided into a main proxy and a backup proxy. If a live broadcast user starts to watch a video stream, the DC pulls the stream from the proxy, and the proxy pulls the stream from the main transcoding server and maintains a heartbeat connection with the main transcoding server. If the heartbeat connection is timed out and the proxy cannot pull the video stream, the proxy may record the hash information in the last received data packet to determine the last video frame number, the last audio frame number, and the last data packet number, and transmit the information to the backup transcoding server.

After receiving the information transmitted by the proxy, the backup transcoding server uses the hash information in the information to find the corresponding video frame in already buffered video frames in a child thread. A main thread of the backup transcoding server starts to encode the new video stream. After finding the corresponding video frame, the child thread encodes already buffered video frames in a low-latency mode. During outputting, a data packet corresponding to a low-latency frame is packaged and outputted with high priority, and then a data packet corresponding to a normally encoded frame is outputted. In one embodiment, the normally encoded frame is generated by the second encoder of the backup transcoder using new input video as source.

Based on the foregoing process, after the main transcoding server is down, stream pulling of the DC is switched from the main transcoding server to the backup transcoding server. The live video stream continues without interruption, so that pictures and sounds on the receiving end are both continuous.

The function of the proxy in the foregoing live broadcast system is to obtain network information as a proxy for a network user. The proxy is a relay station of the network data and information.

As shown in FIG. 6, a technical solution provided in this embodiments of this disclosure includes three parts, namely, two-path transcoding, main-backup switching, and stream splicing. The following embodiments respectively describe the three aspects.

(1) Two-Path Transcoding Design:

The two-path transcoding respectively corresponds to main transcoding and backup transcoding, where the main transcoding is completed by the main transcoder, the backup transcoding is completed by the backup transcoder, and the main transcoding and the backup transcoding may be hard transcoding or soft transcoding. If the main transcoding and the backup transcoding are the soft transcoding, both the encoder and the decoder included in the transcoder in the subsequent embodiments of the soft transcoding may be implemented by processes or sub-processes of corresponding functions, and details are not described again in the subsequent embodiments.

The main transcoder includes a decoder and an encoder, where the decoder is configured to decode an upload stream which is sent to the transcoder, and take a decoding result as an input video source of the encoder, and the encoder adopts IPB-frame mode encoding for the video source from the decoder.

The backup transcoder includes a decoder and two encoders, where the decoder is configured to pull a stream in synchronization with the main transcoder to obtain an upload stream; and buffer a certain number of video frames of the upload stream. If the main transcoder is down, the backup transcoder decodes the buffered video frames and transmits a decoding result to the first encoder. The first encoder adopts low-latency IPP-frame mode encoding, and at the same time the decoder further pulls new input video frames, decodes the video frames, and then transmits the decoded video frames to the second encoder that adopts high-quality IPB-frame mode encoding with higher compression ratio.

(2) Main-Backup Switching:

Based on the previous introduction, once the main transcoder is down, the backup transcoder is immediately started to perform transcoding, the backup transcoder is switched to become the current main transcoder, and the main transcoder that is down is restarted, and the restarted main transcoder is used as the backup transcoder for next switching.

Because the IPB-frame mode encoding is adopted in the main transcoder, and some pre-processing is generally done through lookahead in order to further improve the compression rate, a real encoding process may be delayed by dozens of frames. The number of the delayed frames is determined by the length of the lookahead process. Therefore, when the main transcoder is down, dozens of frames of data are still not encoded. Therefore, when the backup transcoder is started, two encoders may be started at the same time, that is, the first encoder for the low-latency IPP-frame mode encoding and the second encoder for the high-quality IPB-frame mode encoding.

Regardless of whether it is the main transcoder or the backup transcoder, after the video frames of the upload stream are decoded, a hash value of every video frame may be calculated and recorded. The main transcoder only needs to record hash value of the last frame, and the backup transcoder may record the hash values of the latest N image frames. As shown in FIG. 5, N is greater than the length of the lookahead and decoded YUV data of the latest N frames is buffered. Use of the first input first output queue shown in FIG. 5 can keep the buffered video frames updated and the correspondence to the recorded hash values of the video frames maintained. When the main transcoder is down, the video frames buffered in the backup transcoder may not necessarily continue to be updated.

When the backup transcoder is started, the two encoders included in the backup transcoder start encoding at the same time. The operation is performed in the following manner.

A low-latency encoder: a first encoder shown in FIG. 4 only encodes the buffered YUV data when the main transcoder is down and quickly performs encoding without delay. A hash value is used to determine a buffered video frame from which encoding is started. The hash value plays a role in locating the starting video frame. After encoding on the buffered YUV data is completed, the low-latency encoder is turned off. The low-latency encoding may be implemented by using x265, without generating a B-frame. The encoder immediately outputs data of video frames after the YUV data is fed in. No pre-processing is needed. Because there are fewer frames processed by the low-latency encoding, an I-frame interval does not need to be adjusted to be excessively large. At the same time, because the efficiency of the low-latency encoding is relatively low, and in this case, an output code rate does not need to be adjusted to be excessively high either, so the picture quality of the output video frame is relatively poor. Because there are not too many buffered to-be-processed video frames and the proxy switching time is relatively short, the low-latency encoding will not process too many video frames. After the main transcoder is down, the time for which the user sees the deteriorating picture quality is very short, the image sounds are continuous, and then the image quality returns to normal.

A high-quality encoder: a second encoder shown in FIG. 4 may be configured in the same way as the encoder in the original main transcoder, which only encodes the YUV image after the new input video frame is decoded, and performs encoding continuously.

In this way, all upload streams are transcoded. The transcoded streams are continuous with no frame loss and no abrupt peak stream change.

Figure 8:
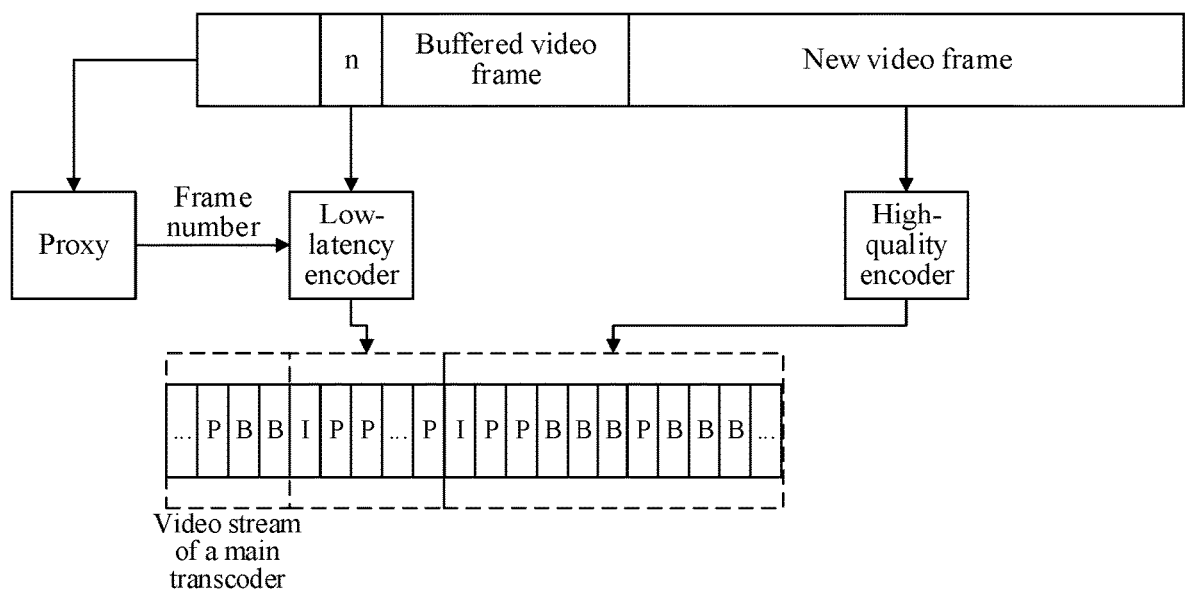
FIG. 8 is a schematic diagram of a transcoding correspondence and splicing according to an embodiments of this disclosure.

(3) Stream Splicing:

This part is mainly to splice video streams generated by the original main transcoder, video streams generated by the low-latency encoder in the backup transcoder, and video streams generated by the high-quality encoder into a complete video stream. As shown in FIG. 8, before the original main transcoder is down, there will be a video stream of the main transcoder. The low-latency encoder of the backup transcoder starts encoding from the frame number of the last image frame at the time when the main transcoder is down, to acquire the low-latency IPP image frames. The high-quality encoder encodes the new video frames to obtain the IPB image frames and connects them in turn.

The stream splicing depends on packaging of image frames. The embodiments of this disclosure further provide a specific packaging method of the image frames. An encoder packaging method may be divided into two categories, that is, a packaging method of output of the low-latency encoder and a main-backup encoder packaging method that ensures a seamless connection of B-frame output, which respectively correspond to the IPP image frame packaging and IPB image frame packaging.

Figure 9:
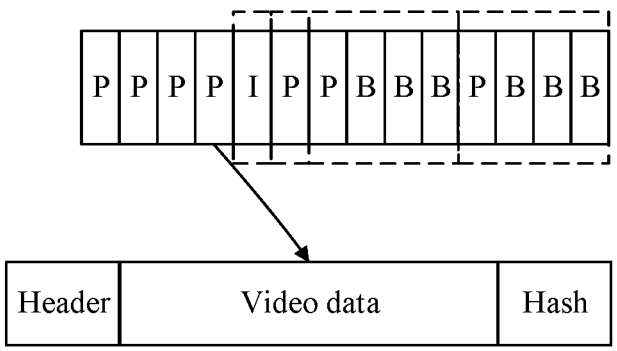
FIG. 9 is a schematic diagram of packaging after transcoding according to an embodiments of this disclosure.

1. The Packaging of Low-Latency Encoding:

The packaging of output of low-latency encoding refers to FIG. 9. Video data outputted by the encoder is as the part in front of the I-frame on the left side in the upper row in FIG. 9 (continuous P-frames on the leftmost side). First, the video data outputted by the encoder, according to a proprietary protocol of the video application and a proprietary data header of a protocol header, acquires hash information of the raw YUV outputted by the corresponding encoding. A message digest algorithm 5 (MD5) hash is currently used, and the hash data is added at the end of the entire single-frame data packet. In this way, each frame of video data is individually packaged and transmitted to an output buffer. The output buffer is used for buffering to-be-transmitted data.

The low-latency encoding has no B-frame encoding involved. Each frame, whether it is an I-frame or a P-frame, is encoded and packaged according to the foregoing method. This can ensure that after the proxy send the cutoff location (video transcoding location when the main transcoder is down), the backup transcoder may always find the next video frame. Both the main transcoder and the backup transcoder perform hash according to the data after the raw stream is decoded, so that hash values corresponding to the same video frame are the same.

2. The Packaging Method of High-Quality Encoding that Includes a B-Frame:

The B-frame encoding of the encoder will cause inconsistency between the encoding order and the displaying order of images, that is, picture order counts (POC). When the main transcoder is down, if the single-frame packaging method is adopted to encode the B-frame, a disorder of outputted pictures may be caused. Therefore, video streams outputted by the main transcoder cannot be combined with streams outputted by the backup transcoder.

Figure 10:
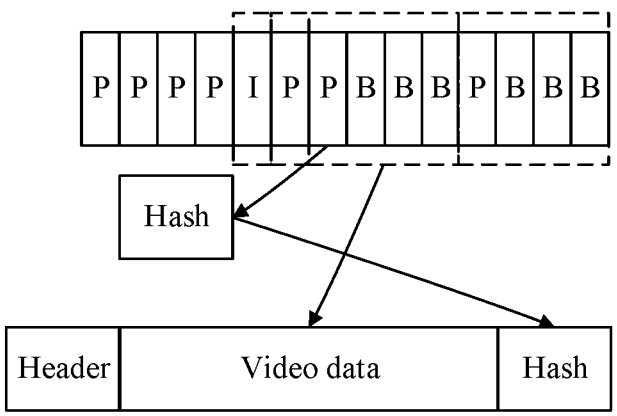
FIG. 10 is a schematic diagram of packaging after transcoding according to an embodiments of this disclosure.

The solution provided by this embodiment is to buffer a group of pictures (GOP) that may be continuously decoded during packaging. This GOP is referred to as a mini-GOP in x265. The schematic diagram of packaging is shown in FIG. 10, where a dotted box is added to represent that the frames of data are transmitted to the output buffer together (i.e., no break up) after being processed together. When the encoder outputs the I-frame, the video frames of the mini-GOP are packaged together, and then the I-frame is packaged individually. When the encoder outputs the P-frame, the video frames of the mini-GOP are packaged together as well, and then the P-frame is packaged individually. In this way, each overall output may be used as an individual decoding sequence. In this embodiment, the continuous B-frames outputted by the encoder may be set to be smaller to improve the efficiency of the encoding and packaging.

Specifically, when video frames in a dotted box are packaged, video hash information of the first non-B-frame of the mini-GOP will be first acquired (the first video frame of each mini-GOP is definitely a non-B-frame). Each video frame in the dotted box is packaged first according to the proprietary protocol of the video application and the corresponding proprietary protocol header. The non-B-frame directly puts its own hash information at the end of the package, and the B-frame copies the hash information of the non-B-frame at the beginning of the mini-GOP and puts it at the end of the package.

In order to ensure that when the encoder outputs the P-frame, the previous mini-GOP can form a decodable video sequence, an Open-GOP function of the encoder may be turned off. Additionally, in order to enable the user to randomly access the stream outputted by the encoder, a repeat-header may be turned on to integrate a picture parameter set (PPS) data packet and a sequence parameter set (SPS) data packet in H.264 when each key frame is outputted.

The foregoing packaging method may ensure that the proxy will always be cut off at the location of the dotted box at each time of cutoff. In this way, the video streams may be connected by the backup transcoder when the hash information of the first non-B-frame (this frame is just the last frame of the playing sequence of the mini-GOP) of the mini-GOP is known.

Specifically, if it is known that the output frame is an I/P/B-frame during the transcoding, and hash information of the corresponding input YUV is known, a code of ffmpeg (fast forward moving picture experts group, being an open source computer program that may be used for recording and converting digital audio and video, and can convert them into streams) may be modified to add a related interface connected to x265.

For the main-backup switching policy in the foregoing embodiment, after a main transcoder is down, switching to a backup transcoder needs to be performed. In order to implement seamless splicing after the main transcoder is down, the backup transcoder needs to complete some initialization operations in advance, which is described below:

After the backup transcoder is successfully started, two encoders of the backup transcoder are immediately initialized. One encoder is initialized in the main thread to set the encoding parameter of the high-quality encoding. The other encoder is initialized in the child thread to set the low-latency encoding parameter. The child thread automatically enters a waiting state.

The backup transcoder may maintain three first input first output (FIFO) queues, each of which buffers a certain number of P2P headers, audio data packets, and decoded YUV video data packets.

After the initialization operations are completed, the state of the backup transcoder is stable. Once a stream pulling request is received, the backup transcoder immediately changes to the transcoding state. The main execution content includes the following two parts:

A first part: finding a starting video frame for encoding after switching:

The proxy pulls a stream from the backup transcoder and transmit the hash information. The corresponding video frame needs to be found in the FIFO queue for buffering the YUV video data packets. The backup transcoder compares the hash values of the buffered video frame, finds the YUV frames with the same hash value from the FIFO queue, and starts the low-latency encoding from the next frame of the frame with the same hash value. The raw YUV after decoding the new video frame is not stored in the FIFO queue anymore, but is transmitted to the high-quality encoder directly. In this case, the two encoders start concurrent encoding.

Figure 11:
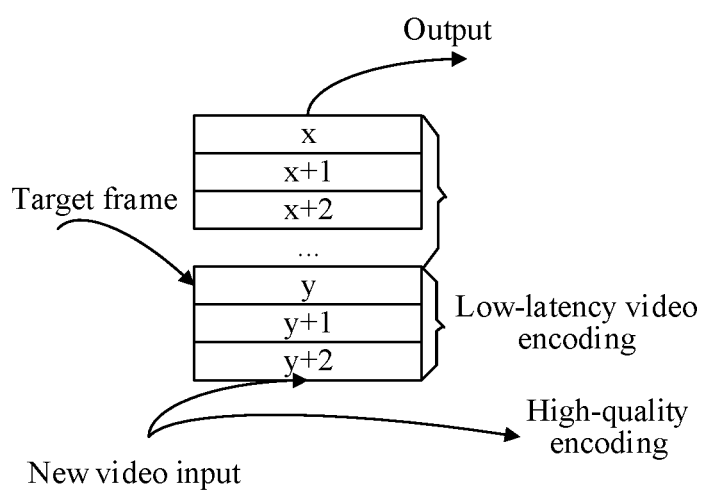
FIG. 11 is a schematic diagram of a location of start encoding after switching according to an embodiments of this disclosure.

As shown in FIG. 11: the output frames including an encoding output of the main transcoder before the main transcoder is down, that is, video frames before frame x to frame right before y; starting low-latency video encoding and outputting after the proxy inputs a target frame (which is the transcoding location of the main transcoder) and informs a corresponding video frame y in the FIFO queue; and using the high-quality encoding after the new video is input, that is, normal video encoding.

A second part: outputting the low-latency encoding output directly and outputting the high-quality encoding output to the temporary buffer:

When the two encoders in the backup transcoder perform concurrent encoding, the two encoders are running in different threads. The low-latency encoding outputs front parts (all are P-frames) as those are not framed by the dotted box in FIG. 9 or FIG. 10. The low-latency encoding output of the parts will be directly transmitted to the output buffer. Because the actual output of the encoding output of the high-quality encoder needs to wait for the low-latency encoder to complete the encoding, the output is temporarily buffered in a temporary buffer. After the low-latency encoder finishes encoding, the high-quality encoder kicks in to transmit the video frames in the temporary buffer to the output buffer at a certain speed, and continues to encode new input video frames.

In an alternative implementation, a single thread is used for control, to output the temporary buffer to the output buffer and continue to perform encoding. There is a certain probability that the video of the receive end has a blurred screen. This is because the amount of data in the temporary buffer may be relatively large, which may cause the high-quality encoder to block, and the output video frames may be lost.

Conversely, this embodiment uses asynchronous buffer output, that is, the output of the high-quality encoder adopts an asynchronous output policy. The high-quality encoder performs encoding normally, an encoding result is buffered in the temporary buffer. In the child thread, data is obtained from the temporary buffer at a certain speed, and then the obtained video frames are transmitted to the output buffer. If the solution of this embodiment is adopted, the video of the receive end may not have a phenomenon of blurred screen.

Figure 12:
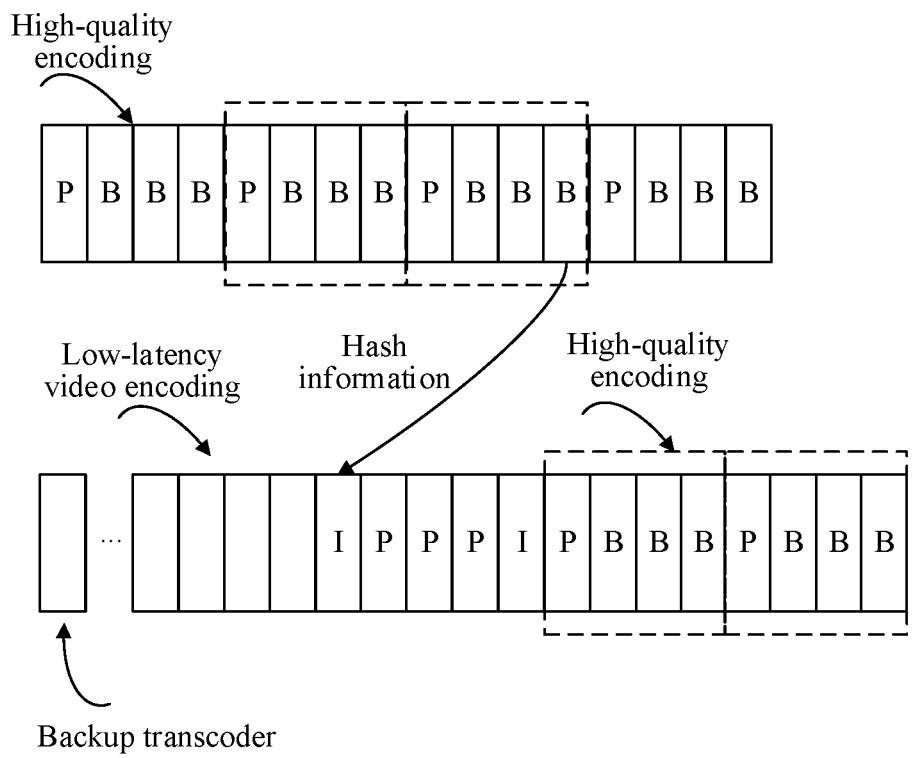
FIG. 12 is a schematic diagram of obtaining a video through concurrent encoding and splicing according to an embodiments of this disclosure.

As shown in FIG. 12, the first line is a transcoding result of the main transcoder, and high-quality IPB-frame mode encoding is used. The main transcoder is down before the second dotted box (mini-GOP) in the first line, and the backup transcoder starts to work. The part before the dotted box in the second line is encoded by a low-latency encoder and the part in the dotted box in the second line is encoded by a high-quality encoder. Hash information of the mini-GOP is acquired and transmitted to the backup transcoder. The backup transcoder will use the mini-GOP and the hash information during packaging. Details refer to the foregoing packaging specification, and are not described herein again.

Figure 13:
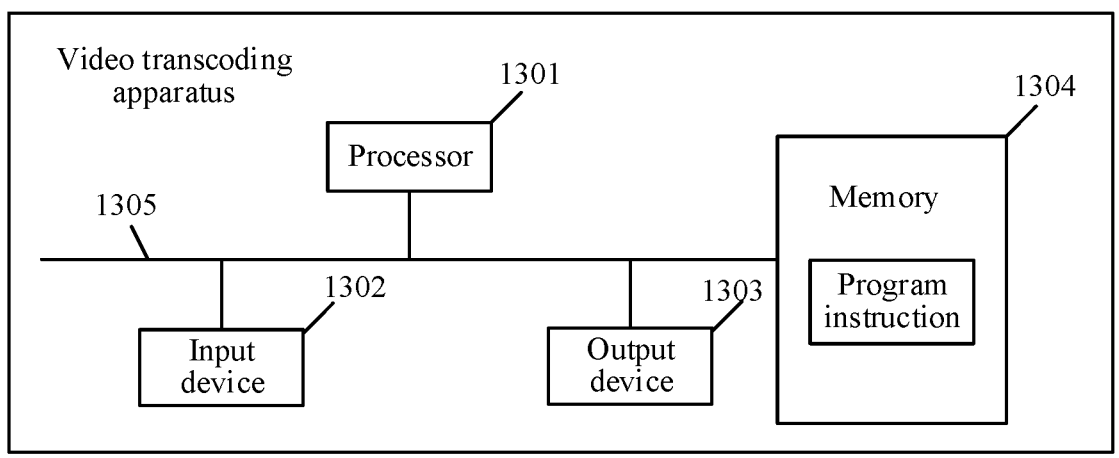
FIG. 13 is a schematic diagram of a video transcoding apparatus according to an embodiments of this disclosure.

Referring to FIG. 13, FIG. 13 is a schematic block diagram of a video transcoding apparatus according to another embodiments of this disclosure. The video transcoding apparatus in this embodiment shown in FIG. 13 may include: one or more processors 1301, one or more input devices 1302, one or more output devices 1303, and a memory 1304. The processor 1301, the input device 1302, the output device 1303, and the memory 1304 are connected through a bus 1305. The memory 1302 is configured to store a computer program. The computer program includes program instructions. The processor 1301 is configured to execute the program instructions stored in the memory 1302. The processor 1301 is configured to call the program instructions to perform the following operations:

transmitting an input video to a main transcoder and a backup transcoder, controlling the main transcoder to transcode the input video and transmitting a transcoded video to a receiving device, and controlling the backup transcoder to buffer the input video;

acquiring a transcoding location information of the main transcoder at the time when the main transcoder is down; and transmitting the transcoding location information to the backup transcoder, controlling the backup transcoder to transcode, according to the transcoding location information, the buffered input video to acquire an output video, and transmitting the output video to the receiving device.

It is to be understood that in the embodiments of this disclosure, the processor 1301 may be a central processing unit (CPU). The processor may further be other general-purpose processor, a digital signal processor (DSP), an application-specific integrated circuit (ASIC), a field-programmable gate array (FPGA), or other programmable logic devices, a discrete gate or a transistor logic device, and a discrete hardware component. The general purpose processor may be a microprocessor or the processor may be any conventional processor or the like.

The input device 1302 may include a touch pad, a fingerprint acquisition sensor (configured to acquire fingerprint information of a user and direction information of a fingerprint), a microphone, or the like. The output device 1303 may include a display (an LCD, or the like), a speaker, or the like.

The memory 1304 may include a ROM and a RAM, and provides an instruction and data to the processor 1301. A part of the storage 1304 may further include a non-volatile random access memory. For example, the storage 1304 may further store information about a device type.

In a specific implementation, the processor 1301, the input device 1302, and the output device 1303 described in this embodiments of this disclosure may execute the video transcoding method provide in any embodiments of this disclosure, and details are not described herein again.

The processor 1301 in this embodiment may execute the method processes in the foregoing method embodiments. If an encoder and a decoder are a soft encoder and a soft decoder, functions of the foregoing encoder and decoder are implemented by executing the program instructions by the processor 1301.

Based on the foregoing description, the embodiments of this disclosure further provide a video transcoding apparatus, including a memory and a processor, the memory being configured to store program instructions, and the program instructions being suitable to be loaded by the processor; and the processor being configured to load the program instructions and perform the video transcoding method according to any one of the embodiments of this disclosure.

Based on the foregoing description, the embodiments of this disclosure further provide a storage medium, storing a plurality of program instructions, the program instructions being suitable to be loaded by a processor and performing the video transcoding method according to any one of the embodiments of this disclosure.

Based on the foregoing description, the embodiments of this disclosure further provide a computer program product, including a plurality of program instructions, the program instructions being suitable to be loaded by a processor and performing the video transcoding method according to any one of the embodiments of this disclosure.

Based on the description of this embodiment, the main transcoder cooperates with the backup transcoder. Because a certain amount of un-transcoded data exists when the main transcoder transcodes input video data, the backup transcoder picks up and continuously transcodes the un-transcoded data in a case that the main transcoder is down. Seamless switchover between the main transcoder and the backup transcoder may be implemented. Accordingly, the smoothness of the video is maintained, black screen is avoided, and the whole system's reliability is improved A person of ordinary skill in the art may notice that the exemplary units and method steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it is not to be considered that the implementation goes beyond the scope of this disclosure.

A person skilled in the art may clearly understand that, for the purpose of convenient and brief description, for specific work processes of the foregoing described communication, apparatus, and unit, reference may be made to corresponding processes in the foregoing method embodiments, and details are not described herein again.

In the several embodiments provided in this disclosure, it is to be understood that the disclosed system, method, and apparatus may be implemented in other manners. For example, the described apparatus embodiment is merely exemplary. For example, the foregoing unit division is merely logical function division and there may be other division manners during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit.

All or some of the foregoing embodiments may be implemented by using software, hardware, firmware, or any combination thereof. When software is used for implementation, all or some of the embodiments may be implemented in a form of a computer program product. The foregoing computer program product includes one or more computer instructions. When the foregoing computer program instructions are loaded and executed on a computer, all or some of the processes or functions according to the embodiments of the present disclosure are produced. The foregoing computer may be a general-purpose computer, a dedicated computer, a computer network, or another programmable apparatus. The foregoing computer instructions may be stored in a computer-readable storage medium or transmitted through the foregoing computer-readable storage medium. The foregoing computer instructions may be transmitted from a website, a computer, a server, or a data center to another web site, computer, server, or data center in a wired (for example, a coaxial cable, an optical fiber, or a digital subscriber line (DSL)) or wireless (for example, infrared, radio, or microwave) manner. The foregoing computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a read-only memory (ROM) or a random access memory (RAM), a magnetic disk, a compact disc, or the like.

What is claimed is:

1. A video transcoding system, comprising:
   a main transcoder circuitry configured to acquire an input video, transcode the input video to generate a transcoded video, and transmit the transcoded video to a receiving device; and
   a backup transcoder circuitry configured to:
      acquire the input video;
      buffer the input video in a buffer which is maintained by the backup transcoder circuitry;
      acquire transcoding location information of the main transcoder circuitry at the time when the main transcoder circuitry is down, wherein the transcoding location information comprises hash information and a frame number of the last video frame generated by the main transcoder circuitry when the main transcoder circuitry is down, a corresponding audio frame number, and a corresponding last data packet number, and wherein the transcoding location information indicates a starting location in the buffer for un-transcoded input video by the main transcoder circuitry when the main transcoder circuitry goes down;
      transcode the buffered input video according to the transcoding location information to generate an output video which connects to the last video frame the main transcoder transcodes before the main transcoder circuitry goes down; and
      transmit the output video to the receiving device.

2. The video transcoding system according to claim 1, wherein:
   the backup transcoder circuitry comprises a decoder and a first encoder;
   the decoder is configured to decode the buffered input video according to the transcoding location information to obtain buffered decoded data, and transmit the buffered decoded data to the first encoder; and
   the first encoder is configured to receive the buffered decoded data and encode the buffered decoded data to obtain the output video.

3. The video transcoding system according to claim 2, wherein:
   the backup transcoder circuitry further comprises a second encoder;
   the decoder is further configured to decode an acquired new input video into new decoded data and transmit the new decoded data to the second encoder, the new input video being received after the main transcoder circuitry is down;
   the second encoder is configured to receive the new decoded data, encode the new decoded data to obtain an additional output video; and
   the backup transcoder circuitry is configured to transmit the additional output video to the receiving device.

4. The video transcoding system according to claim 3, an encoding latency of the first encoder being lower than an encoding latency of the second encoder; and an encoding quality of the second encoder being higher than an encoding quality of the first encoder.

5. The video transcoding system according to claim 3, wherein:
   an encoding result of the second encoder comprises a B-frame; and
   the second encoder is further configured to:
      encode a video frame of the last non-B-frame in the buffered input video to obtain a group of pictures that can be continuously decoded and buffer the group of pictures; and
      package and transmit the group of pictures to an output buffer, and then package and transmit the first I-frame or P-frame of video frames obtained by encoding the new decoded data to the output buffer.

6. The video transcoding system according to claim 3, wherein:
   the first encoder is further configured to transmit video frames generated through encoding of the buffered input video by the first encoder to an output buffer; and
   the second encoder is further configured to transmit video frames acquired through encoding by the second encoder to a temporary buffer, and transmit the video frames in the temporary buffer to the output buffer according to a first-in first-out order after the first encoder stops encoding.

7. The video transcoding system according to claim 1, wherein:
   the backup transcoder circuitry stores the input video into a first-in first-out queue frame by frame and discards, when the queue is full, a video frame that is at the head of the queue.

8. A video transcoding method, performed by a computing device, the method comprising:
- transmitting an input video to a main transcoder circuitry and a backup transcoder circuitry, controlling the main transcoder circuitry to transcode the input video and transmitting a transcoded video to a receiving device, and controlling the backup transcoder circuitry to buffer the input video in a buffer which is maintained by the backup transcoder circuitry;
- acquiring a transcoding location information of the main transcoder circuitry at the time when the main transcoder circuitry is down, wherein the transcoding location information comprises hash information and a frame number of the last video frame generated by the main transcoder circuitry when the main transcoder circuitry is down, a corresponding audio frame number, and a corresponding last data packet number, and wherein the transcoding location information indicates a starting location in the buffer for un-transcoded input video by the main transcoder circuitry when the main transcoder circuitry goes down; and
- transmitting the transcoding location information to the backup transcoder circuitry, controlling the backup transcoder circuitry to transcode, according to the transcoding location information, the buffered input video to generate an output video which connects to the last video frame the main transcoder circuitry transcodes before the main transcoder circuitry goes down, and transmitting the output video to the receiving device.

9. The method according to claim 8, wherein controlling the backup transcoder circuitry to transcode, according to the transcoding location information, the buffered input video comprises:
- controlling a decoder of the backup transcoder circuitry to decode the buffered input video according to the transcoding location information to obtain buffered decoded data, and transmitting the buffered decoded data to a first encoder of the backup transcode circuitry; and
- controlling the first encoder of the backup transcoder circuitry to encode the buffered decoded data to obtain the output video.

10. The method according to claim 9, further comprising:
- transmitting a new input video to the decoder, controlling the decoder to decode the new input video into new decoded data, transmitting the new decoded data to a second encoder, the new input video being an input video received after the main transcoder circuitry is down;
- controlling the second encoder to receive the new decoded data and encode the new decoded data to obtain an additional output video; and
- controlling the backup transcoder circuitry to transmit the additional output video to the receiving device.

11. The method according to claim 10, an encoding latency of the first encoder being lower than an encoding latency of the second encoder; and an encoding quality of the second encoder being higher than an encoding quality of the first encoder.

12. The method according to claim 10, wherein:
- an encoding result of the second encoder comprising a B-frame; and
- the method further comprises:
  - controlling the second encoder to encode a video frame at the last non-B-frame location of the buffered input video to obtain a group of pictures that can be continuously decoded and buffer the group of pictures; and
  - packaging and transmitting the group of pictures to an output buffer, and then packaging and transmitting the first I-frame or P-frame of a video frame obtained by encoding the new decoded data to the output buffer.

13. The method according to claim 10, further comprising:
- transmitting video frames acquired through encoding of the first encoder to an output buffer;
- transmitting video frames acquired through encoding of the second encoder to a temporary buffer; and
- transmitting the video frames in the temporary buffer to the output buffer according to a first-in first-out order after the first encoder stops encoding.

14. The method according to claim 8, further comprising:
- setting the backup transcoder circuitry as a current main transcoder circuitry after the main transcoder circuitry is down, setting the main transcoder circuitry that is down as a current backup transcoder circuitry, and restarting the main transcoder circuitry that is down.

15. An apparatus for video transcoding, comprising a memory for storing computer instructions and a processor in communication with the memory, wherein, when the processor executes the instructions, the processor is configured to:
- transmit an input video to a main transcoder circuitry and a backup transcoder circuitry, control the main transcoder circuitry to transcode the input video and transmit a transcoded video to a receiving device, and control the backup transcoder to buffer the input video in a buffer which is maintained by the backup transcoder circuitry;
- acquire a transcoding location information of the main transcoder circuitry at the time when the main transcoder circuitry is down, wherein the transcoding location information comprises hash information and a frame number of the last video frame generated by the main transcoder circuitry when the main transcoder circuitry is down, a corresponding audio frame number, and a corresponding last data packet number, and wherein the transcoding location information indicates a starting location in the buffer for un-transcoded input video by the main transcoder circuitry when the main transcoder circuitry goes down; and
- transmit the transcoding location information to the backup transcoder circuitry, control the backup transcoder circuitry to transcode, according to the transcoding location information, the buffered input video to generate an output video which connects to the last video frame the main transcoder circuitry transcodes before the main transcoder circuitry goes down, and transmit the output video to the receiving device.

16. The apparatus according to claim 15, wherein when the processor is configured to cause the apparatus to control the backup transcoder circuitry to transcode, according to the transcoding location information, the buffered input video, the processor is configured to cause the apparatus to:
- control a decoder of the backup transcoder circuitry to decode the buffered input video according to the transcoding location information to obtain buffered decoded data, and transmit the buffered decoded data to a first encoder of the backup transcoder circuitry; and control the first encoder of the backup transcoder circuitry to encode the buffered decoded data to obtain the output video.

17. The apparatus according to claim 16, wherein, when the processor executes the instructions, the processor is configured to further cause the apparatus to:
transmit a new input video to the decoder, control the decoder to decode the new input video into new decoded data, transmit the new decoded data to a second encoder, the new input video being an input video received after the main transcoder circuitry is down;
control the second encoder to encode the new decoded data to obtain an additional output video; and
control the backup transcoder circuitry to transmit the additional output video to the receiving device.

18. The apparatus according to claim 17, an encoding latency of the first encoder being lower than an encoding latency of the second encoder; and an encoding quality of the second encoder being higher than an encoding quality of the first encoder.

19. The apparatus according to claim 17, wherein:
an encoding result of the second encoder comprising a B-frame; and
when the processor executes the instructions, the processor is configured to further cause the apparatus to:
control the second encoder to encode a video frame at the last non-B-frame location of the buffered input video to obtain a group of pictures that can be continuously decoded and buffer the group of pictures; and
package and transmit the group of pictures to an output buffer, and then package and transmit the first I-frame or P-frame of a video frame obtained by encoding the new decoded data to the output buffer.

20. A non-transitory storage medium for storing computer readable instructions, the computer readable instructions, when executed by a processor, causing the processor to:
transmit an input video to a main transcoder circuitry and a backup transcoder circuitry, control the main transcoder circuitry to transcode the input video and transmit a transcoded video to a receiving device, and control the backup transcoder circuitry to buffer the input video in a buffer which is maintained by the backup transcoder circuitry;
acquire a transcoding location information of the main transcoder circuitry at the time when the main transcoder circuitry is down, wherein the transcoding location information comprises hash information and a frame number of the last video frame generated by the main transcoder circuitry when the main transcoder circuitry is down, a corresponding audio frame number, and a corresponding last data packet number, and wherein the transcoding location information indicates a starting location in the buffer for un-transcoded input video by the main transcoder circuitry when the main transcoder circuitry goes down; and
transmit the transcoding location information to the backup transcoder circuitry, control the backup transcoder circuitry to transcode, according to the transcoding location information, the buffered input video to generate an output video which connects to the last video frame the main transcoder circuitry transcodes before the main transcoder circuitry goes down, and transmit the output video to the receiving device.

* * * * *